US006879642B2

(12) United States Patent
Taskinen

(10) Patent No.: US 6,879,642 B2
(45) Date of Patent: Apr. 12, 2005

(54) METHOD OF CLIPPING SIGNAL AMPLITUDES IN A MODULATION SYSTEM

(75) Inventor: Kimmo Taskinen, Espoo (FI)

(73) Assignee: Nokia Corporation, Espoo (FI)

( * ) Notice: Subject to any disclaimer, the term of this patent is extended or adjusted under 35 U.S.C. 154(b) by 444 days.

(21) Appl. No.: 10/181,173

(22) PCT Filed: Dec. 14, 2000

(86) PCT No.: PCT/FI00/01099
§ 371 (c)(1),
(2), (4) Date: Jul. 15, 2002

(87) PCT Pub. No.: WO02/49308
PCT Pub. Date: Jun. 20, 2002

(65) Prior Publication Data
US 2002/0197966 A1 Dec. 26, 2002

(51) Int. Cl.[7] .............................................. H04L 27/12
(52) U.S. Cl. ...................................................... 375/302
(58) Field of Search ................................. 375/271, 272, 375/278, 279–285, 302–308; 332/100, 103; 455/110

(56) References Cited

U.S. PATENT DOCUMENTS

| | | | |
|---|---|---|---|
| 6,192,089 B1 | * | 2/2001 | Corleto et al. ............... 375/344 |
| 6,647,067 B1 | * | 11/2003 | Hjelm et al. ................ 375/260 |
| 2002/0154678 A1 | * | 10/2002 | Doetsch et al. ............. 375/130 |

FOREIGN PATENT DOCUMENTS

WO  99/63723  12/1999

OTHER PUBLICATIONS

Jun. 21, 2001, International Search Report for PCT/FI00/01099.

* cited by examiner

Primary Examiner—Don N. Vo
(74) Attorney, Agent, or Firm—Squire, Sanders & Dempsey L.L.P.

(57) ABSTRACT

Amplitudes of signals produced by a digital modulator can be clipped so that instead of processing the output vector of the digital modulator or it's component vectors, processing is applied to the base band I and Q signals prior to modulation. The I- and Q signals are applied to an input of a clipping circuit. Predetermined limit values are also applied to another input of the clipping circuit. The clipping circuit rotates on the I-Q vector towards the limit vector. At the same time the limit vector is rotated towards the I-Q vector. Rotations are performed by using Cordic algorithm. After rotations have been completed, the rotated I-Q vector is aligned with the original limit vector, and the rotated limit is aligned with the original I-Q vector. Then the length of the rotated I-Q vector will be compared with the original limit vector. If the rotated I-Q vector is shorter than the limit vector, then the original I-Q signals are output signals from the clipping circuit. But if the rotated original I-Q vector is longer than the limit vector, then the original I-Q signals will be rejected and substituted by the coordinate values of the rotated limit vector.

16 Claims, 5 Drawing Sheets

METHOD OF CLIPPING SIGNAL AMPLITUDES IN A MODULATION SYSTEM

FIELD OF THE INVENTION

The present invention relates generally to a method of clipping amplitudes of output signals from a digital modulator. Especially the invention relates to processing signal points arranged on a rectangular plane

BACKGROUND OF THE INVENTION

Over the past several years, code-division multiple access (CDMA) systems have gained widespread interest in the mobile wireless communications field. Both a wide band code division multiple access (WCDMA) and a narrow band code division multiple access CDMA system have been presented. The WCDMA uses a wider channel compared to the narrow band system, which improves frequency diversity effects and therefore reduces fading problems.

The modulation method in CDMA systems is quadrature amplitude modulation QAM. This term is used to describe the combining of two amplitude and phase modulated carriers in quadrature. Quadrature refers to a phase difference of 90 degrees between the two carriers. One of the carriers is known as the In Phase carrier and the other as the Quadrature carrier. One carrier can be a digitally modulated sine wave, while the other carrier is a digitally modulated cosine wave of the same frequency. Thus, the task of every QAM modulator is to perform a circular rotation of [I(n), Q(n)].

FIG. 1 illustrates a digital modulator on a WCDMA system. Spread and scrambled complex-valued physical channels are combined in adder 10 using complex addition. The result is a complex-valued chip sequence that is applied to splitter 11. The splitter splits the complex-valued chip sequence into two parallel branches. The signals in the upper branch and in the lower branch are real-valued signals. Usually the signal in the upper branch is denoted as I signal and the signal in the lower branch is denoted as Q signal.

The modulation is QPSK (Quadrature Phase Shift Keying), wherein the I signal is multiplied in a multiplier 14 with a cosine signal having frequency $f_L$ and the Q signal is multiplied in a multiplier 15 with a sine signal having the same frequency $f_L$. Then the resulting signals are summed in a summing element 16 wherein the sum signal is the output signal of the modulator. Usually both the I signal and the Q signal are shaped in shaping filters (not shown).

FIG. 2 depicts a constellation point of an I-signal and a Q-signal represented on a 2-dimensional plane. This plane is called the In phase and Quadrature plane, shortly as the I-Q plane. As seen from the figure, the distance of the constellation point from the origin can be seen as the top end of the vector that is formed from two components, namely the Q component and the I component. The position of the constellation point on the I-Q plane, i.e. the length and the angle of the vector, depends on the I and Q values which, on the other hand, depend on the modulation scheme used.

When the continuous output signal of the modulator is denoted as s(t), the I-signal is denoted as I(n) and the Q-signal is denoted as Q(n), the output signal can be expressed according to the following formula:

$$s(t)=I(n)\cos(\omega t)+Q(n)\sin(\omega t) \quad (1)$$

The maximum amplitude of the output signal s(t) is $$\max\{s(t)\}=\sqrt{I(n)^2+Q(n)^2}. \quad (2)$$

Note: this is the same as the length of the vector shown in FIG. 2.

In a digital domain the points of the amplitudes of a digitally modulated signal form constellation points on the I-Q plane. Constellation of the signal points on the I-Q plane has a great effect on the signal-to-noise (S/N) ratio and transmission error rate. The transmission error rate depends on the distance between the signal points. If the distance is too small, a signal point adjacent to the true signal point may be extracted erroneously in the receiver. On the other hand, the shape of the constellation affects the operation of the transmitter. It is known in the art that the power of a modulated signal based on a signal point in the I-Q plane is proportional to the square of the distance between the signal point and the origin of the I-Q plane. In other words, the farther the signal point is from the origin, the higher is the power of the modulated signal corresponding to that point.

For several reasons the constellation points of a real modulator are not optimal, usually some output vectors are too extensive. Therefore, in prior art modulators' output vectors must be clipped in some way.

A straightforward way is simply to shorten the output vectors that are too long. The task is to limit the amplitude of the two-dimensional vector to a certain value and retain its original direction. Generally this means that the amplitude of the vector has to be calculated first and if it exceeds the limit, the original vector will be scaled. This procedure consists of operations as multiplication, square root and division, which are very difficult to implement efficiently using digital logic like ASICs or FPGAs or digital signal processors DSPs. This means that approximate methods must be used. However, this causes inaccuracy because, due to features of digital logic, it is difficult to maintain direction of the original vector.

FIG. 3 depicts a rectangular constellation of the signal points of a 64-level modulation scheme. In this example, each point in the constellation represents a modulation symbol comprised of a unique combination of six bits. Points along the horizontal axis represent all possible modulations of a single cosine carrier, whereas points along the vertical axis represent all possible modulations of a single sine carrier. This kind of constellation can be achieved by so-called square clipping where each vector component x, y, is limited (clipped) independently.

$$r_{result}=x_{result}e_x+y_{result}e_y,$$

where $$x_{result} = \begin{cases} -r_{limit}, & x < -r_{limit} \\ x, & |x| \le r_{limit} \\ r_{limit}, & x > r_{limit} \end{cases} \text{ and } y_{result} = \begin{cases} -r_{limit}, & y < -r_{limit} \\ y, & |y| \le r_{limit} \\ r_{limit}, & y > r_{limit} \end{cases} \quad (3)$$

In the formulas $e_x$ is the unit vector of the Q axis and $e_y$ is the unit vector of I axis.

This clipping is very easy to implement with hardware but its quality is not very good. The amplitude error is in the range $0 \le G < 20 \log\sqrt{2}$ dB$\approx$3 dB and the angle error is limited to $|\theta|<45°$.

However, the rectangular constellation is an unfavorable form because the signal points on the corners reside far from the origin. Those signal points, like signal point 1 in FIG. 3, have the greatest energy. Therefore, it is known to arrange the constellation to form a hexagonal shape, which is depicted by a dotted line in FIG. 3.

The optimal form of the constellation would be a circle, minimizing the average energy per symbol. The effect of the circular constellation is 0.7 dB in comparison to the hexagonal form and around 3 dB in comparison to the rectangular form. Unfortunately, arranging the constellation in a circle is difficult to implement in the praxis and the improvement in the effectiveness increases greatly the complexity of the modulator.

However, when the rectangular or hexagonal constellation shapes are used, the output of the transmitter is prone to saturation due to the high-power modulated signals in the corners. For that reason, the maximum output power of the transmitter is to be limited in accordance with the corner points. Therefore, the output power of the other points is not as high as the transmitter would allow. Consequently, the capacity of the transmitter is not used optimally. Nevertheless, the rectangular constellation is widely used but with a power control circuit to which the output signal of the modulator is applied. This diminishes the drawbacks caused by the constellation shape.

A drawback of the prior art methods is the difficulty to limit the peak transmission power of the transmitter. Limitation using rectangular or hexagonal constellation is in praxis very difficult because it must be based on a trial and error method. Another drawback is the difficulty in maintaining the original direction of the vector. Known methods require relatively complex implementations.

SUMMARY OF THE INVENTION

An objective of the present invention is to devise a method that causes amplitudes of signals produced by a digital modulator to be below a predetermined limit value but still maintaining the original direction of the vector.

Another objective is to devise a method that allows simple and accurate practical implementation of clipping of a vector in a modulator.

The objectives are achieved so that instead of processing the output vector of a digital modulator or it's component vectors, processing is applied to the base band I and Q signals prior to modulation, i.e. prior to multiplication with a sine signal and a cosine signal, respectively.

The I- and Q signals are applied to an input of a clipping circuit. Predetermined limit values are also applied to another input of the clipping circuit. The clipping circuit rotates on the I-Q plane the values of the I- and Q signals, i.e. the vector ending at the constellation point I,Q, towards the vector ending at the limit values. At the same time the vector ending at the limit values is rotated towards the vector ending at the constellation point I,Q. Rotations are performed by using Cordic algorithm. After the rotations have been completed, the vector ending at the constellation point I,Q is aligned with the vector ending at the limit values prior to its rotation, and the vector ending at the limit values is aligned with the vector ending at the constellation point I,Q prior to its rotation.

Now the length of the rotated I-Q vector will be compared with the limit vector. If the rotated I-Q vector is shorter than the limit vector, then the original I-Q vector is accepted and the original I- and Q signals are output signals from the clipping circuit. Consequently, modulation of the carrier is carried out with the original I- and Q signals.

But if the rotated original I-Q vector is longer than the limit vector, then the original vector will be rejected and substituted by a vector, which is the rotated limit vector. Consequently, modulation of the carrier is carried out with the I- and Q signal values that the rotated limit vector have.

One of the central ideas of the invention is to choose the limit values properly. Namely, the vector ending at the limit values is chosen so that it is aligned to either the Q axis or the I axis. Hence, the vector starts from the origin and extends either along the positive Q axis or along the positive I axis. The vector has a predetermined length that is the same as the clipping limit of the clipping circuit.

BRIEF DESCRIPTION OF THE DRAWINGS

The invention is described more closely with reference to the accompanying drawings in which.

DETAILED DESCRIPTION OF THE PREFERRED EMBODIMENT

Figure 1:
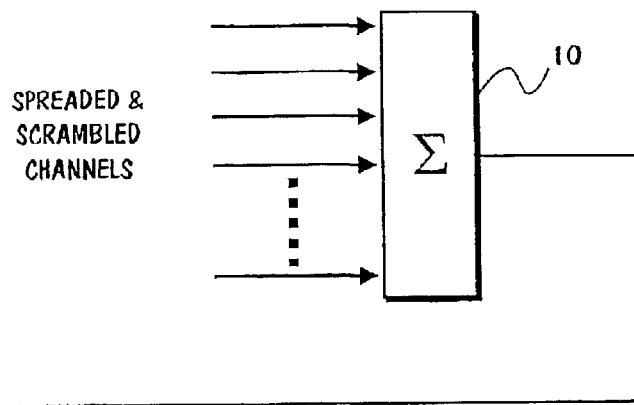
FIG. 1 is a schematic diagram of a QAM modulator.
Figure 2:
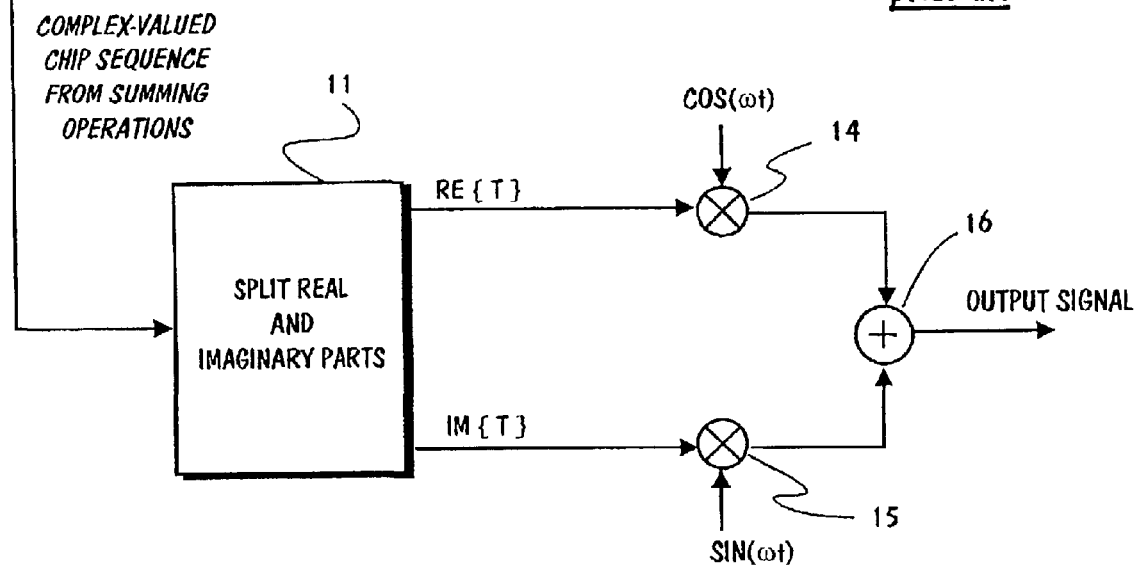
FIG. 2 depicts an I-Q vector on I-Q plane.
Figure 2:
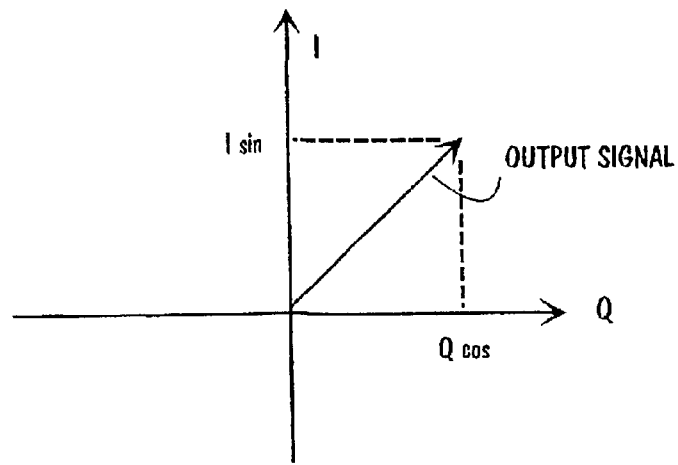
Figure 3:
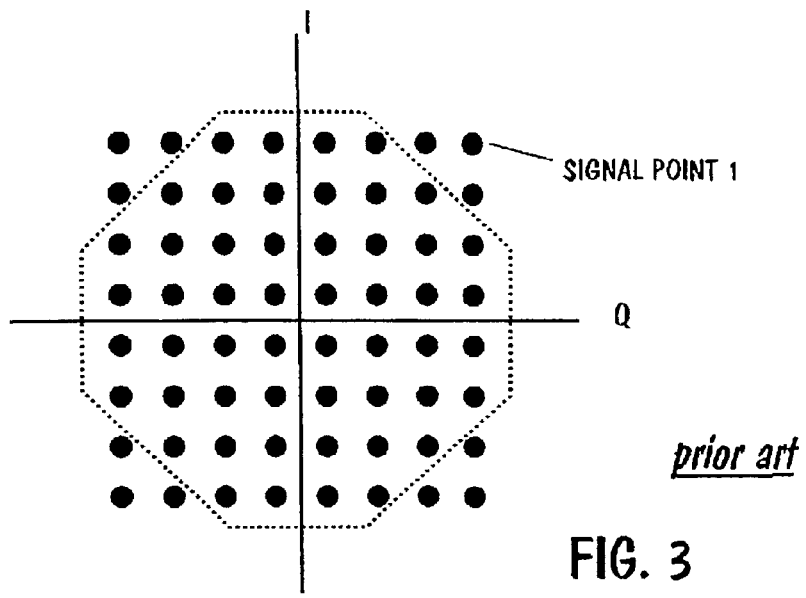
FIG. 3 shows a rectangular constellation.
Figure 4:
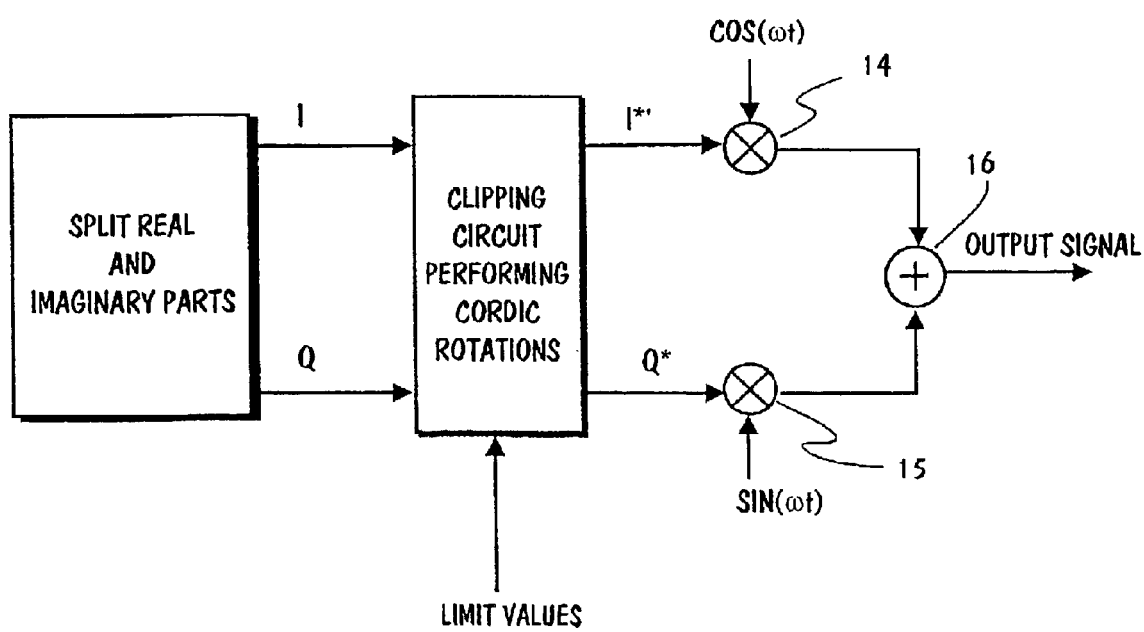
FIG. 4. illustrates location of the clipping circuit in the modulator.

FIG. 4 illustrates the location of the clipping circuit in the modulator. As can be seen, it is located between the splitting circuit 11 and multipliers 14 and 15. Hence, I- and Q signals from the splitting circuit are input signals to the clipping circuit. Other input signals to the clipping circuit are two limit values. Output signals from clipping circuit 11 are denoted I* and Q*. Signal I* is applied to multiplier 14 and signal Q* is applied to multiplier 15.

Figure 5:
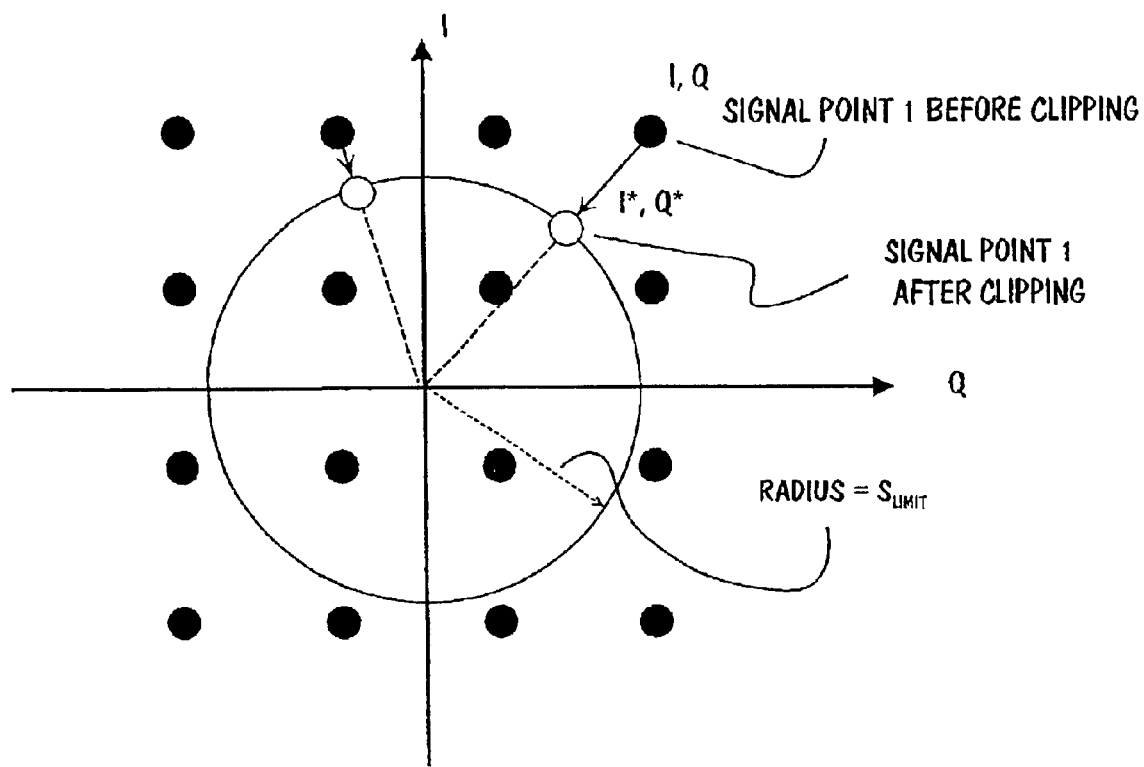
FIG. 5 depicts relocation of a signal point.

FIG. 5 shows what the clipping circuit does to a signal point having too large amplitude. Each pair consisting of an I-signal and Q-signal forms a signal point called as a constellation point on the I-Q plane. Some signal points are denoted as black dots in the figure. Length S of the vector that starts from the origin and ends at a signal point (I,Q) is $$S=\sqrt{I^2+Q^2} \qquad (4)$$

Hereafter such vectors are called I-Q vectors.

The previously mentioned limit values, which are also applied to inputs of the clipping circuit, are denoted $I_{LIMIT}$ and $Q_{LIMIT}$. On the I-Q plane limitation can be seen as a limit vector that starts from the origin and ends at signaling point $I_{LIMIT}, Q_{LIMIT}$ Thus, length $S_{LIMIT}$ of the limit vector is $$S_{LIMIT}=\sqrt{I_{LIMIT}^2+Q_{LIMIT}^2} \qquad (5)$$

When length $S_{LIMIT}$ is fixed, then all pairs of the $I_{LIMIT}, Q_{LIMIT}$ values that fulfill the equation above are located along a circle whose radius is $S_{LIMIT}$ (see FIG. 5). Hereafter all the vectors starting from origin and ending at the circle are called limit vectors.

Referring again to FIG. 5, the clipping circuit functions so that it shortens any I-Q vector, the end point of which is located outside the circle having radius $S_{LIMIT}$, in such amount that the endpoint (I,Q) moves along the vector to the circle and gets new I and Q values. For example, signal point 1 having values I,Q is replaced with a new signal point that is located on the circle with radius $S_{LIMIT}$ and has the values denoted I* and Q*. This can be expressed according to the following limitation condition:

If $\sqrt{I^2+Q^2} > S_{LIMIT}$ then vector S is shortened to the end point (I* Q*) so that $$\sqrt{(I^*)^2+(Q^*)^2} \leq S_{LIMIT} \text{ is valid.} \qquad (6)$$

In reality it is impossible to always input new limitation values each time when a new signal point value (I,Q) is received from the splitting circuit, because at the beginning of the clipping period the signal point value is unknown, i.e. the length and angle of each I-Q vector varies vector by vector.

Therefore limit values $I_{LIMIT}, Q_{LIMIT}$ are selected to be constant and, moreover, so that either $I_{Limit}$ or $Q_{LIMIT}$ is zero. Hence, the limit values are either $I_{LIMIT}$, 0 or 0, $Q_{LIMIT}$. This means that the limit vector is aligned either along the I axis or along the Q axis on the I-Q plane. The advantage of this selection will be apparent later.

The clipping circuit performs the above-mentioned limitation condition by applying the CORDIC algorithm to perform circular rotation of the I-Q vector and the limit vector. Said algorithm is described in the reference J. E. Volder, "The CORDIC Trigonometric Computing Technique," IRE Trans. on Electron. Comput., Vol. EC-8, No. 3, pp. 330–334, September 1959.

The CORDIC (Coordinate Rotation Digital Computer) computing technique was developed especially for use in a real-time digital computer where the majority of the computation involved the discontinuous, programmed solution of the trigonometric relationships of navigation equations and a high solution rate for the trigonometric relationships of coordinate transformations. In the algorithm a sequence of conditional additions and subtractions are used. The coordinate components of a vector and an angle of rotation are given and the coordinate components of the original vector, after rotation through the given angle, are computed.

Hence, the circular rotation that is used in the present invention is implemented efficiently using the CORDIC algorithm, which is an iterative algorithm for computing many elementary functions.

Now, the principle of the CORDIC algorithm will be shortly described. The main task of the invented clipping method is to perform a circular rotation of [I(n), Q(n)]T.

Figure 6:
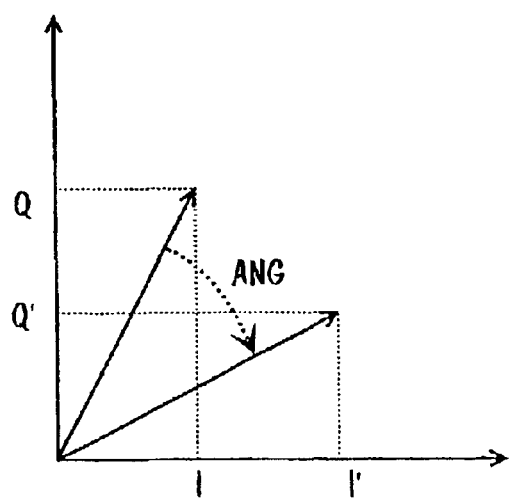
FIG. 6 illustrates rotation of a vector.

This is illustrated in FIG. 6, in which coordinates of an original vector are I,Q. The original vector is rotated by an angle denoted here ANG. Hence, the coordinates of the vector are changed from I and Q to I' and Q'.

Mathematically this can be expressed:

$$I' = I \cdot \cos(ANG) + Q \cdot \sin(ANG)$$

$$Q' = Q \cdot \cos(ANG) - I \cdot \sin(ANG) \qquad (7)$$

The equations above can be rearranged as follows:

$$I_{i+1} = K_i [I_i + Q_i d_i 2^{-i}] \qquad (9)$$

$$Q_{i+1} = K_i [Q_i - I_i d_i 2^{-i}]$$

$$K_i = \cos(\tan^{-1}(2^{-i}))$$

Arbitrary angles of rotation are obtainable by performing a series of successively smaller elementary rotations. The rotation angles are restricted so that $\tan(Ang_i) = \pm 2^{-i}$, where I=0, 1, 2 . . . , whereupon the multiplication by the tangent term is reduced to binary shift operations in the implemented circuit.

The iterative rotation can now be expressed according to the equations (9):

$$I' = \cos(ANG) \cdot [I + Q \cdot \tan(ANG)] \qquad (8)$$

$$Q' = \cos(ANG) \cdot [Q - I \cdot \tan(ANG)]$$

where $K_i$ is a scale constant and
$d_i = -1$ or $+1$, depending of the direction of the rotation.

Without the scale constant both the vector components go rapidly the full scale. However, removing scale constant $K_i$ from the iterative equations (9) yields a simple shift-add algorithm for vector rotation. Removal of the scale constant can be taken into account by shortening (scaling) the original vector. The CORDIC rotation algorithm has a gain of approximately g=1.647 and therefore scaling is most convenient to perform with the gain, provided that the original vector is aligned with either of the coordinate axes.

Removing the scale constant yields the equations (10):

$$I_{i+1} = [I_i + Q_i d_i 2^{-i}] \qquad (10)$$

$$Q_{i+1} = [Q_i - I_i d_i 2^{-i}]$$

where $d_i = -1$ or $+1$, depending of the direction of the rotation.

Equations (10) are used in performing rotations of the vectors.

Figure 7:
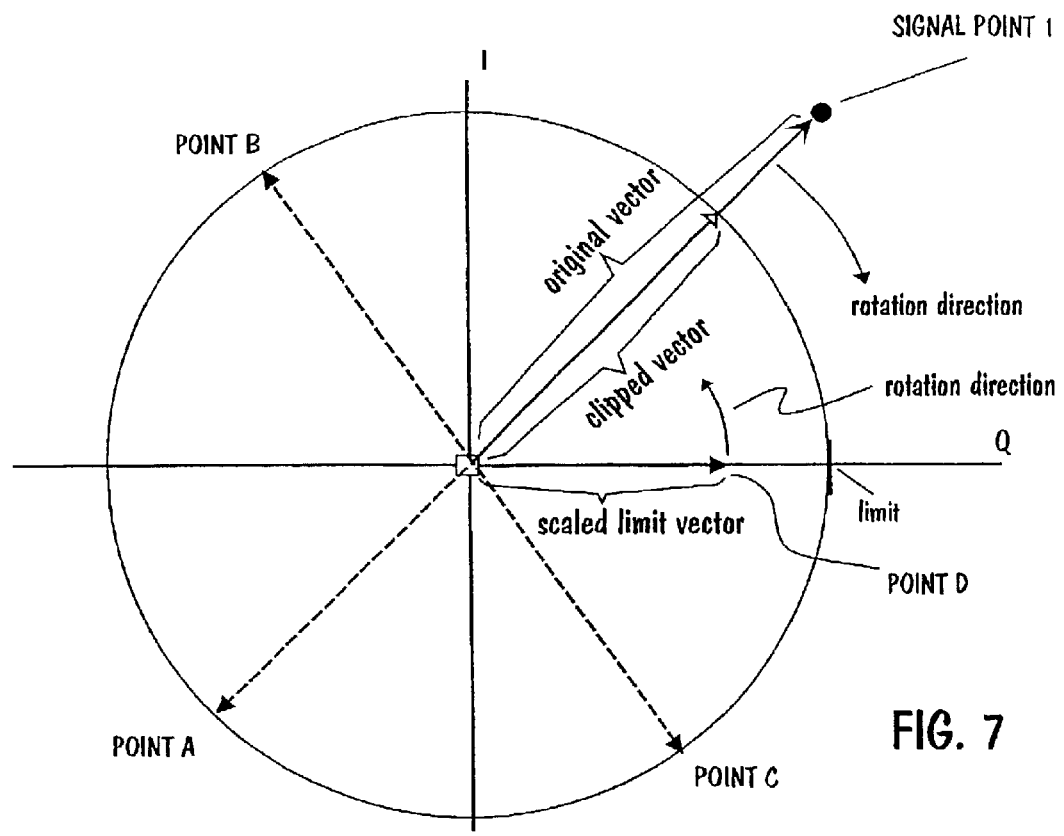
FIG. 7 illustrates vectors before Cordic rotations.

FIG. 7 illustrates operations that the clipping circuit carries out for each I-Q signal pair received from the splitter in order to achieve the result shown in FIG. 5. I-Q signal pairs are produced at a base band modulation rate, at 16 MHz for example. The signal pairs are treated as vectors, wherein the length and angle of each vector received varies vector by vector. Further, for clarity let us assume that signal point 1 in FIG. 7 corresponds signal point 1 in FIG. 5.

Referring back to FIG. 7, the positions of the original vector and the scaled limit vector are shown. The original vector starts from the origin and ends at signal point 1. It should be noted that because the total rotation angle that can be reached with the Cordic rotation is limited to about ±90°, an initial rotation of 180° might be required. In consequence, if the end point of the original vector were point A, the vector must be rotated initially at a 180° angle so that signal point A changes to signal point 1. Accordingly, if the end point of another original vector were point B, the vector must be rotated initially at a 180° angle so that signal point B changes to signal point C. Initialization is easy because initialization is achieved just by changing the signs of the original vector components.

The limit values $I_{LIMIT}, Q_{LIMIT}$ are also taken as a vector. As explained previously, the values are chosen so that the pair is $I_{LIMIT}$, 0 or 0, $Q_{LIMIT}$. In the figure, the pair is 0, $Q_{LIMIT}$, wherein the limit vector begins from the origin, is aligned along the Q axis, and ends at the point $Q_{LIMIT}$. Then the limit vector is scaled down with the gain of the Cordic rotation by dividing the clipping limit vector by the gain, g=1.647. Now, the starting position of the scaled limit vector starts from the origin and ends at point D.

Now, the Cordic rotation of the vectors starts. The target of the iterative rotations is that the original I-Q vector will be rotated from signal point 1 towards the Q axis until it reaches the original direction of the scaled limit vector. At the same time the scaled limit vector is rotated by the same amount but in the opposite direction, i.e. towards the original I-Q vector, until it reaches the direction of the original vector. Rotation directions are shown with the arrows in FIG. 7.

Figure 8:
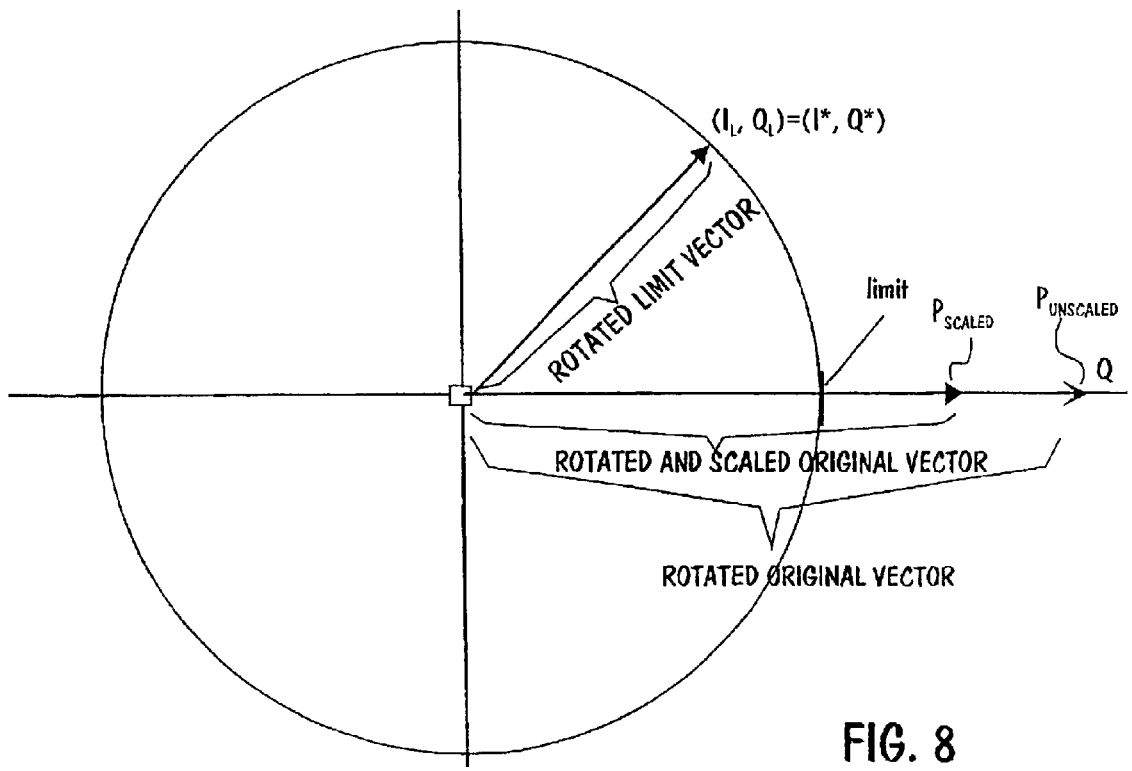
FIG. 8 illustrates vectors after Cordic rotations.

FIG. 8 illustrates the positions of the vectors after Cordic rotation steps have been performed. Thus, after the predefined rotation steps the original vector is parallel, or almost parallel, with the Q axis. But, due to the feature that is characteristic of the Cordic algorithm, the length of the vector has grown during rotation with gain g, wherein the top end of the rotated original vector hits point $P_{UNSCALED}$ in the Q axis. Therefore the true amplitude of the rotated original vector is obtained by dividing value $P_{UNSCALED}$ by gain g of the Cordic rotation. As a result, the true top end of the rotated original vector will be at the point $P_{SCALED}$ in the Q axis.

Now the reason to choose the limit values so that the limit vector extends along the Q axis (or along the I axis) is seen. This is because there is no need to compute the length of the rotated original vector; the length is simply Q value at the point $P_{SCALED}$.

At the same time as the original I-Q vector is rotated, the scaled limit vector is rotated to be parallel to the original I-Q vector. During rotation the length of the scaled vector increases. After rotation has been performed, the vector has increased by gain g of the Cordic rotation. But because the limit vector has been scaled by factor g prior rotation, the result is that the length of the rotated limit vector is in the ideal case the same as the radius of the circle, i.e. the limit value $Q_{LIMIT}$. Coordinate values of the rotated limit vector are denoted $I_L$, $Q_L$ in FIG. 8.

Now, the clipping circuit makes a decision which will be output values I* and Q* from the circuit (see FIG. 4). The rotated and scaled original vector is compared to the limit vector. This is an easy task because it is sufficient to compare the Q- value of the point $P_{SCALED}$ in the Q axis to the value $Q_{LIMIT}$. If the length of the original vector is longer than the limit vector, i.e. the Q- value of the point $P_{SCALED}$ in the Q axis is greater than the value $Q_{LIMIT}$, then the length of the original vector exceeds the limit value. In consequence, the rotated limit vector will be used as the output vector of the clipping circuit, i.e. coordinate values $I_L$, $Q_L$ of the rotated limit vector are used as output values I*, Q* from the clipping circuit.

But, if the length of the rotated and scaled original vector is shorter than the limit vector, i.e. the Q- value of the point $P_{SCALED}$ in the Q axis is smaller than the value $Q_{LIMIT}$, then I and Q values of the original I-Q vector will be used as output values I*, Q* from the clipping circuit.

Figure 9:
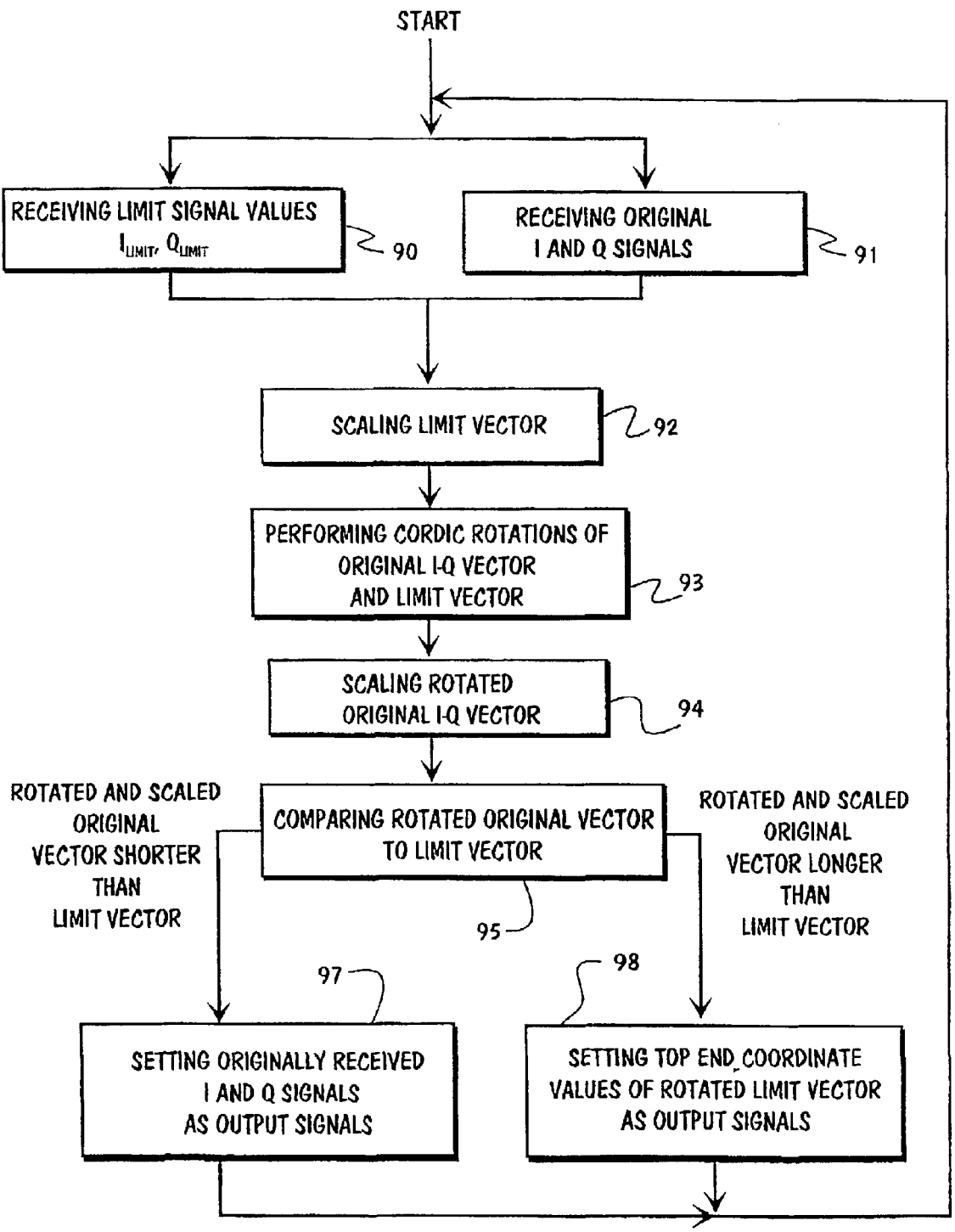
FIG. 9 is a simplified block diagram of the method.

FIG. 9 depicts the main steps performed by the clipping circuit. The method begins by receiving I and Q signals, step 91, and the limit values, step 90. Then the limit vector corresponding to the limit values is scaled by the gain of the Cordic rotation in order that the amplitude of the vector after rotation will not exceed the amplitude of said vector before rotation, step 92. Naturally, scaling of the limit vector can be done only once and the result is stored in a memory from which it can be read.

Now, the Cordic rotation of the vectors starts, step 93. The target of the iterative rotations is that the original I-Q vector will be rotated so that it reaches the original direction of the scaled limit vector. At the same time the scaled limit vector is rotated by the same amount but in the opposite direction, i.e. towards the original I-Q vector, so that it reaches the original direction of the original I-Q vector.

Because the amplitude of the rotated original vector has grown during rotation, it must be divided by gain g of the Cordic rotation, step 94. Then the rotated and scaled original vector is compared to the limit vector, step 95. If the length of the rotated and scaled original vector is longer than the limit vector, then the top end coordinates I*, Q* of the rotated limit vector will be used as the output signal values of the clipping circuit, step 98. But if the length of the rotated and scaled original vector is shorter than the limit vector, then the original I and Q signals will be used as the output signal values of the clipping circuit, step 99.

The invented CORDIC based clipper can be implemented with an array of interconnected adders/subtractors. So it can be realized with the basic logic structure in existing FPGAs. Preferably, it is meant for the logic structures that correspond to Configurable Logic Blocks (CLBs) for Xilinx® XC4000 family and Logic Elements (LEs) for the Altera's® FLEX devices in particular. The method can be also implemented with ASIC or digital signal processors (DSPs).

If the infinite precision calculation is assumed, the angle and amplitude accuracy is completely determined by the number of iteration steps used in Cordic rotation. Angle error is limited to the value of the last rotation step angle $|\theta|<\arctan 2^{-N+1}$. For example with eight iterations the angle accuracy is ±0.45°. Amplitude error is limited to $0 \text{ dB} \leq G < -20 \log[\cos(\arctan 2^{-N+1})]\text{dB}$. Again as an example the maximum amplitude error is less than 0.0003 dB if eight iterations are used. It is very clear that the overall accuracy is also strongly dependent on the precision used in the calculations and it is even dominant in almost any practical solution. The great benefit of the invented method is that implementation can be scaled to any required accuracy just by adding iteration steps. Although the invented method requires multiplication and division operations, the divisor and multiplier are constant (Cordic rotation gain) and those operations can be implemented easily.

What is claimed is:

1. A method of processing I and Q signals produced for a digital modulator, the signals being treated as the orthogonal vector components of an original I-Q vector on a rectangular coordinate plane comprising the Q axis and the I axis, comprising the steps of:

specifying two limit values determining a limit vector originating from the origin and ending at the limit values;

rotating the original I-Q vector by using Cordic rotation algorithm stepwise in a number of steps towards the limit vector until the rotated original vector is approximately aligned with the limit vector;

rotating the limit vector by using Cordic rotation algorithm stepwise in the same number of steps towards the original I-Q vector;

comparing the length of the rotated original I-Q vector to the length of the limit vector;

applying the original I and Q signals to the digital modulator if the rotated original vector is shorter than the limit vector, and applying the I and Q coordinate values of the rotated limit vector to the digital modulator if the rotated original vector is longer than the limit vector.

2. A method as in claim 1, further comprising the step of:

setting either of the limit values to zero, wherein the limit vector extends either along the Q-axis or along the I-axis.

3. A method as in claim 2, wherein for the length of the limit vector and for the length of the rotated original I-Q vector are set the Q coordinates of said vectors when the limit vector extend along the Q-axis.

4. A method as in claim 2, wherein for the length of the limit vector and for the length of the rotated original I-Q vector are set the I coordinates of said vectors when the limit vector extend along the I-axis.

5. A method as in claim 1, further comprising the step of:
scaling the limit vector before rotation by dividing said vector with a gain of the Cordic rotation algorithm, wherein during the rotation the length of the scaled limit vector grows into the length of the limit vector.

6. A method as in claim 1, further comprising the step of:
scaling the rotated original I-Q vector by dividing the length of the vector with a gain of the Cordic rotation algorithm, wherein the length of the rotated and scaled original vector is compared to the length of the limit vector.

7. A method as in claim 1, wherein rotation of the original I-Q vector and rotation of the limit vector are performed simultaneously.

8. A method as in claim 1, wherein when the original vector is residing outside the total rotation angle reached with the Cordic rotation, the original I-Q vector and the limit vector are initially rotated at angle 180° by changing the signs of the vector components.

9. A method as in claim 1, wherein the amount of rotation steps is fixed beforehand.

10. A clipping circuit for processing original I and Q input signals prior to applying them to a digital modulator, the input I and Q signals being treated as the orthogonal vector components of an original I-Q vector on a rectangular coordinate plane comprising the Q axis and the I axis, comprising:

another input for limit values, said limit values determining a limit vector originating from the origin and ending at the limit;

first Cordic rotation means for rotating the original I-Q vector stepwise in a predetermined number of steps towards the limit vector until the rotated original vector is approximately aligned with the limit vector;

second Cordic rotation means for rotating the limit vector stepwise in the predetermined number of steps towards the original I-Q vector until the rotated limit vector is approximately aligned with the original vector;

means for comparing the length of the rotated original I-Q vector to the length of the limit vector;

selection means for applying the original I and Q signals to the digital modulator if the rotated original I-Q vector is shorter than the limit vector, and the I and Q coordinate values of the rotated limit vector to the digital modulator if the rotated original vector is longer than the limit vector.

11. A clipping circuit as in claim 10, the circuit further comprising scaling means for scaling the limit vector before rotation by dividing said vector with a gain of the Cordic rotation algorithm.

12. A clipping circuit as in claim 11, the circuit further comprising another scaling means for scaling the rotated original I-Q vector after rotation by dividing said vector with a gain of the Cordic rotation algorithm, wherein the rotated and scaled original I-Q vector is compared to the limit vector.

13. A clipping circuit as in claim 11, wherein first Cordic rotation means and second Cordic rotation means are adapted to rotate vectors simultaneously.

14. A clipping circuit as in claim 13, wherein the output of first Cordic rotation means is coupled back to the input to said means and the output of second Cordic rotation means is fed back to the input to said means, wherein each rotation step is performed by the same means.

15. A clipping circuit as in claim 11, wherein first and second Cordic rotation means are implemented by using field programmable gate arrays (FPGA).

16. A clipping circuit digital modulator as in claim 11, wherein first and second Cordic rotation means are implemented by using a digital signal processor.

* * * * *